United States Patent [19]

Kumagai et al.

[11] Patent Number: 5,555,235
[45] Date of Patent: Sep. 10, 1996

[54] OPTICAL FIBER GYRO WITH MEMORY STORING DATA MEASURED UNDER APPLICATION OF ANGULAR VELOCITY

[75] Inventors: Tatsuya Kumagai; Hiroshi Kajioka; Munehiro Akiyama; Shigeru Oho; Hisao Sonobe, all of Ibaraki-ken, Japan

[73] Assignees: Hitachi Cable, Ltd.; Hitachi, Ltd., both of Tokyo, Japan

[21] Appl. No.: 305,490

[22] Filed: Sep. 13, 1994

[30] Foreign Application Priority Data

Sep. 13, 1993 [JP] Japan .................................. 5-226999

[51] Int. Cl.⁶ .................................................. G01C 19/72
[52] U.S. Cl. ........................................................ 356/350
[58] Field of Search ............................................ 356/350

[56] References Cited

U.S. PATENT DOCUMENTS 4,637,722  1/1987  Kim ...................................... 356/350
5,272,516  12/1993  Ashizuka ............................ 356/350

FOREIGN PATENT DOCUMENTS 4231814  8/1992  Japan ...................................... 356/350

Primary Examiner—Samuel A. Turner
Attorney, Agent, or Firm—Helfgott & Karas, P.C.

[57] ABSTRACT

A signal processing circuit of an optical fiber gyro comprises a memory for storing data measured in the signal processing circuit in accordance with angular velocities applied to an optical fiber sensing loop at preparatory stage, and the applied angular velocities. In operation, the memory is accessed in accordance with data obtained in the signal processing circuit at an operation stage, so that an angular velocity is read from the memory without complicated calculation.

5 Claims, 9 Drawing Sheets

FIG. 4

| ANGULAR VELOCITY $\Omega_a$ OF TURN TABLE 23 | MEASURED VALUE $x_1$ |
|---|---|
| — | A/D CONVERTER 10 (SATURATION) |
| 1 °/sec | 0.0996 |
| 0 °/sec | −0.0004 |
| −1 °/sec | −0.1004 |
| — | A/D CONVERTER 10 (SATURATION) |

(CONSTANT VALUE braces around the saturation rows)

FIG. 6

| CORRECTED ANGULAR VELOCITY Ω | MEASURED VALUE $x_1$ |
|---|---|
| — | A/D CONVERTER 10 (SATURATION) |
| 0.996 °/sec | 0.0996 } CONSTANT VALUE |
| −0.004 °/sec | −0.0004 } CONSTANT VALUE |
| −1.004 °/sec | −0.1004 |
| — | A/D CONVERTER 10 (SATURATION) |

FIG. 8

| MEASURED VALUE $x_1$ | | CORRECTED ANGULAR VELOCITY $\Omega$ | |
|---|---|---|---|
| CONSTANT VALUE | — — — | CONSTANT VALUE | — — — |
| CHANGE → | 0.001 | | 0.01 °/sec |
| EFFECTIVE | 0 | | 0 °/sec |
| CHANGE → | −0.001 | | −0.01 °/sec |
| CONSTANT VALUE | — — — | CONSTANT VALUE | — — — |

OPTICAL FIBER GYRO WITH MEMORY STORING DATA MEASURED UNDER APPLICATION OF ANGULAR VELOCITY

FIELD OF THE INVENTION

The invention relates to an optical fiber gyro, and more particularly to, the improvement on response speed and measuring precision in an optical fiber gyro using a phase modulating method.

BACKGROUND OF THE INVENTION

A first conventional optical fiber gyro comprises an optical fiber sensing loop through which lights radiated from a laser light source propagate in the clockwise (CW) and counter clockwise (CCW) directions, a phase modulator for modulating the light to be propagated through the sensing loop, a light detector for receiving the light propagated through the sensing loop to generate an electric signal, and a signal processing circuit for processing the electric signal to calculate an angular velocity of a rotating member on which the sensing loop is mounted.

In operation, a light radiated from the laser light source is divided into lights to be propagated through the sensing loop in the CW and CCW directions. Then, the lights propagated through the sensing loop in the CW and CCW directions are coupled to be supplied to the light detector, from which an electric output signal corresponding to the received light is supplied to the signal processing circuit.

In the signal processing circuit, an angular velocity of the rotating member is detected in accordance with Sagnac phase difference $\phi s$ which is generated in the CW and CCW propagating lights by Sagnac effect. The Sagnac effect is described in, for instance, the U.S. Pat. No. 5,272,516, and the relation between the angular velocity $\Omega$ and the Sagnac phase difference $\phi s$ is defined below.

$$\Omega = (1/a)\phi s \qquad (1)$$

where a is a constant.

The output signal supplied from the light detector to the signal processing circuit comprises a DC (direct current) component, a fundamental wave component, a duplicate harmonic wave component, a triplicate harmonic wave component, a quadruple harmonic wave component, etc. which are defined by output signals corresponding to the CW and CCW lights, triangular functions of the Sagnac phase difference and the phase modulating frequency, and respective orders of Bessel functions based on a phase modulating degree. The output signal is synchronously detected in the signal processing circuit to generate a fundamental wave component $S_1$, a duplicate harmonic wave component $S_2$, and a quadruple harmonic wave component $S_4$.

In accordance with the synchronous detection of the output signal, the angular velocity is detected as explained below.

(1) When the phase modulation of the CW and CCW lights is carried out to make the ratio $S_4/S_2$ constant, the ratio of the first and second order Bessel functions is constant. Thus, the angular velocity $\Omega$ is detected by using an Arctan ($\tan^{-1}$) function based on the detected ratio $s_1/S_2$.

(2) When the phase modulation of the CW and CCW lights is not carried out to make the ratio $S_4/S_2$ constant, the ratio of the first and second order Bessel functions is calculated in accordance with the ratio of the second and fourth order Bessel functions which is calculated from the non-constant ratio $S_4/S_2$. Thus, the angular velocity $\Omega$ is detected by using an Arctan ($\tan^{-1}$) function based on the detected ratio $S_2/S_1$ and the calculated ratio of the first and second order Bessel functions.

In general, the fundamental wave component $S_1$ is multiplied in a pre-amplifier by an amplication factor K. Thus, a multiplied value S ($=S_1 \times K$) is obtained to enhance the detecting sensitivity of an angular velocity, and the multiplied value S is used to determine as to whether a measuring range should be changed over. In such a case, the value S/K is used as a fundamental wave component $S_1$ to calculate an angular velocity $\Omega$.

Other than the above described conventional optical fiber gyro, the Japanese Patent Kokai No. 4-231814 which was laid open on Aug. 20, 1992 describes a second conventional optical fiber gyro which comprises a memory for storing a relation of output signals and angular velocities in the form of a polygonal line, and characteristic amounts of the polygonal line.

In operation, an angular velocity is detected by reading the angular velocity from the memory based on a detected output signal in consideration of the characteristic amounts.

In the first conventional optical fiber gyro, however, there are disadvantages in that a response speed is low, because using an Arctan ($\tan^{-1}$) function takes a long time, and detecting/precision is not high, because (1) a result of the Arctan ($\tan^{-1}$) function and a detected value do not coincide to each other in accordance with the non-linear characteristics of an optical system and an electric circuit system in the optical fiber gyro, (2) a measuring range is changed over by the value S ($=S_1 \times K$), thereby shifting a measuring range changing point in accordance with the change in output power of a light source, so that the state is changed between calibration and operation, (3) the divisional calculation S/K ($=S_1$) is carried out, and (4) the detected angular velocity includes an error caused by the rotation of the earth.

The second conventional optical fiber gyro has a disadvantage in that detecting precision is not high, because a deviation amount between a value of an Arctan ($\tan^{-1}$) function and a detected value is different for each optical fiber gyro, in addition to the same disadvantages as discussed in the first conventional optical fiber gyro.

SUMMARY OF THE INVENTION

Accordingly, it is an object of the invention to provide an optical fiber gyro in which a response speed is high.

It is another object of the invention to provide an optical fiber gyro in which detecting precision is high.

According to the invention, an optical fiber gyro, comprises:

means for providing two lights;

means for modulating a phase of at least one of the two lights;

an optical fiber sensing loop for propagating the two lights in clockwise and counter clockwise directions, the optical fiber sensing loop being mounted on a rotating member, and the at least one of the two lights being supplied from the modulating means;

an optical coupler for coupling the two lights propagated through the optical fiber sensing loop and supplied therefrom to provide a coupled light;

a light detector for receiving the coupled light to generate an output signal; and a signal processing circuit for processing the output signal to detect an angular velocity of the rotating member;

wherein the signal processing circuit, comprises:

means for generating data dependent on an angular velocity of the rotating member by processing the output signal;

a memory for storing angular velocities applied at a preparatory state on the rotating member, and data generated in the generating means when the angular velocities are applied at the preparatory state on the rotating member; and means for reading an angular velocity corresponding to data generated in the generating means at an operation state.

BRIEF DESCRIPTION OF THE DRAWINGS

The invention will be explained in more detail in conjunction with appended drawings, in which:

FIGS. 4 to 9 are explanatory diagrams showing tables stored in a memory in the optical fiber gyro in the preferred embodiment.

DESCRIPTION OF THE PREFERRED EMBODIMENTS

Figure 1:
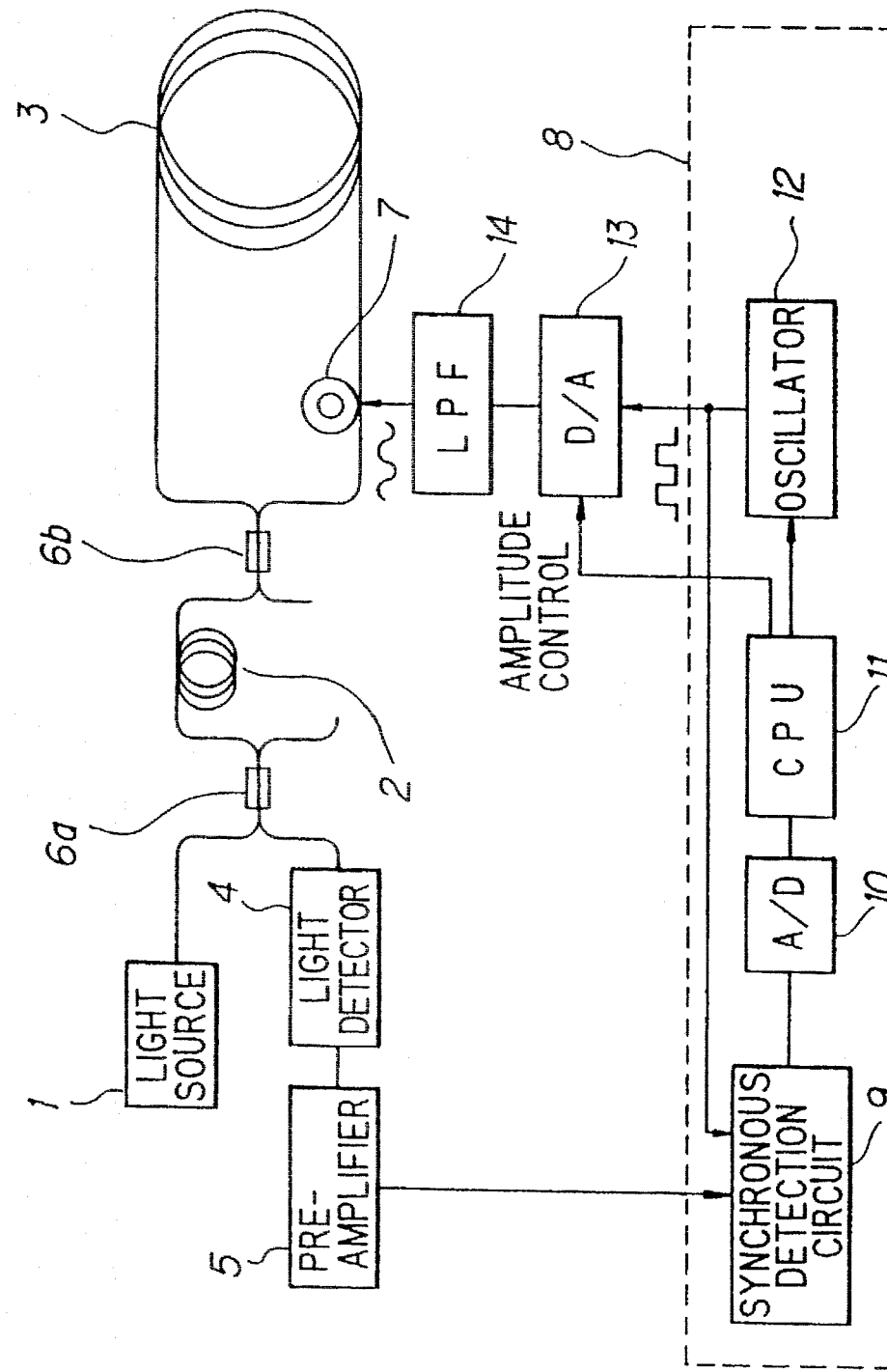
FIG. 1 is a block diagram showing a conventional optical fiber gyro.

Before describing an optical fiber gyro in a preferred embodiment according to the invention, the aforementioned first conventional optical fiber gyro will be explained in FIG. 1.

The first conventional optical fiber gyro comprises a laser light source 1, a polarizer 2, an optical fiber sensing loop 3, a light detector 4, a preamplifier 5, optical couplers 6a and 6b, a phase modulator 7, a signal processing circuit 8 including a synchronous detection circuit 9, an analog to digital (A/D) convertor 10, a CPU 11, and an oscillator 12, a digital to analog converter 13, and a low pass filter (LPF) 14.

In the first conventional optical fiber gyro, a laser light radiated from the light source 1 is divided into two lights by the optical coupler 6a, and one of the divided lights is supplied via the polarizer 2 and the optical coupler 6b to the sensing loop 3 to be CW and CCW lights propagating through the sensing loop 3. One of the CW and CCW light is modulated in phase by the phase modulator 7 prior to the propagation of the sensing loop 3. The CW and CCW propagated lights are coupled in the optical coupler 6b to be supplied via the polarizer 2 and the optical coupler 6a to the light detector 4.

When the sensing loop 3 is rotated on a rotating member (not shown) by an angular velocity $\Omega$, a Sagnac phase difference $\phi s$ occurs between the CW and CCW propagated lights by "Sagnac effect". The phase difference $\phi s$ and the angular velocity $\Omega$ have a proportional relation which is represented by the equation (1), as explained before.

$$\Omega = (1/a)\phi s \tag{1}$$

where a is a constant.

In accordance with the equation (1), the angular velocity $\Omega$ is obtained by detecting the phase difference $\phi s$.

An output signal which is obtained by converting a light signal received in the light detector 4 to an electric signal is supplied to via the pre-amplifier 5 to the signal processing circuit 8.

The phase modulator 7 applies a phase modulation of a phase modulating degree m on one of the CW and CCW propagating lights by receiving a sine-wave signal of a constant frequency fm supplied via the D/A converter 13 and the LPF 14 from the oscillator 12 in the signal processing circuit 8. As a result, the output signal obtained in the light detector 4 includes a signal component of a phase modulated frequency (fundamental wave) and plural components of harmonic waves.

In general, an instantaneous value P of the output signal is represented by the equation (2).

$$\begin{aligned}
P &= P_L + P_R + 2\sqrt{P_L \cdot P_R} \cdot \cos(\phi_S + m \cdot \cos 2\pi f_m t) \\
&= P_L + P_R + 2\sqrt{P_L \cdot P_R} \cdot J_0(m)\cos\phi_S - \quad \text{(DC component)} \\
&\quad 4\sqrt{P_L \cdot P_R} \cdot J_1(m)\sin\phi_S \cdot \cos(2\pi f_m t) - \quad \text{(Fundamental wave component)} \\
&\quad 4\sqrt{P_L \cdot P_R} \cdot J_2(m)\cos\phi_S \cdot \cos(2\pi \cdot 2f_m t) + \quad \text{(Duplicate harmonic wave)} \\
&\quad 4\sqrt{P_L \cdot P_R} \cdot J_3(m)\sin\phi_S \cdot \cos(2\pi \cdot 3f_m t) + \quad \text{(Triplicate harmonic wave)} \\
&\quad 4\sqrt{P_L \cdot P_R} \cdot J_4(m)\cos\phi_S \cdot \cos(2\pi \cdot 4f_m t) \quad \text{(Quadruple harmonic wave)}
\end{aligned}$$

where $P_L$ and $P_R$ are amplitudes (maximum values) of the CW and CCW lights, m is a phase modulating degree, fm is a phase modulating frequency, $J_0(m)$ to $J_4(m)$ are Bessel functions, and $\phi s$ is a Sagnac phase difference.

The output signal is supplied via the pre-amplifier 5 to the synchronous detection circuit 9 in which synchronous detection is carried out for each predetermined frequency component in accordance with a synchronous signal supplied from the oscillator 12.

A fundamental wave component $S_1$, and duplicate and quadruple harmonic wave components $S_2$ and $S_4$ are represented by the equations (3) to (5).

$$S_1 = \sqrt{P_L \cdot P_R} \cdot J_1(m)\sin\phi_S \tag{3}$$

$$S_2 = \sqrt{P_L \cdot P_R} \cdot J_2(m)\cos\phi_S \tag{4}$$

$$S_4 = \sqrt{P_L \cdot P_R} \cdot J_4(m)\cos\phi_S \tag{5}$$

The equation (1) is modified to define the equations (6) to (8) in accordance with a ratio $S_1/S_2$ between the fundamental wave component $S_1$ and the duplicate harmonic wave component $S_2$ which are obtained in the equations (3) and (4).

$$\frac{S_1}{S_2} = \frac{J_1(m)}{J_2(m)} \tan\phi_S \quad (6)$$

$$\phi_S = \tan^{-1}\left[\frac{J_2(m)}{J_1(m)} \cdot \frac{S_1}{S_2}\right] \quad (7)$$

$$\Omega = \frac{1}{a} \tan^{-1}\left[\frac{J_2(m)}{J_1(m)} \cdot \frac{S_1}{S_2}\right] \quad (8)$$

The equation (9) is defined in accordance with the equations (4) and (5).

$$\frac{S_4}{S_2} = \frac{J_4(m)}{J_2(m)} \quad (9)$$

Thus, the angular velocity $\Omega$ is detected as explained before, and discussed again below.

(1) When the phase modulator 7 modulates one of the CW and CCW lights to make the ratio $S_4/S_2$ constant, the angular velocity $\Omega$ is obtained in accordance with the measured value $S_1/S_2$ by using the Arctan ($\tan^{-1}$) function (the equation (8)) into which the constant value $J_2(m)/J_1(m)$ is substituted.

(2) When the phase modulator 7 does not modulates one of the CW and CCW lights to make the ratio $S_4/S_2$ constant, the angular velocity $\Omega$ is detected by calculating the ratio $J_2(m)/J_1(m)$ based on the ratio $J_4(m)/J_2(m)$ calculated from the ratio $S_4/S_2$, and substituting the ratios $J_2(m)/J_1(m)$ and $S_1/S_2$ into the Arctam ($\tan^{-1}$) function (the equation (8)).

Next, an optical fiber gyro in the preferred embodiment according to the invention will be explained in FIG. 2, wherein like parts are indicated by like reference numerals as used in FIG. 1.

In addition to the structure as shown in FIG. 1, the optical fiber gyro comprises an EEPROM (electrically erasable and programmable read only memory) 15 included in the signal processing circuit 8.

Figure 2:
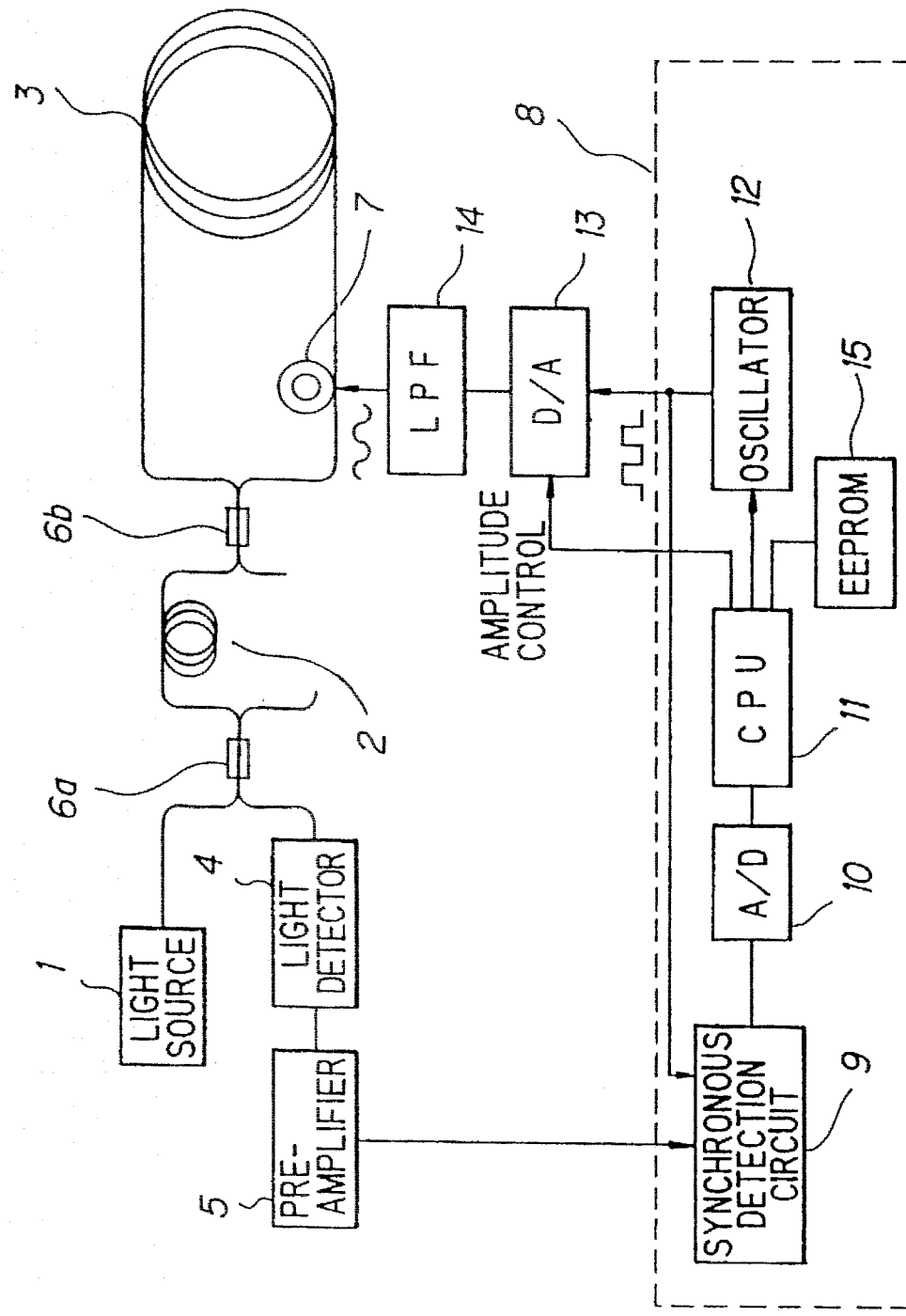
FIG. 2 is a block diagram showing an optical fiber gyro in a preferred embodiment according to the invention.
Figure 3:
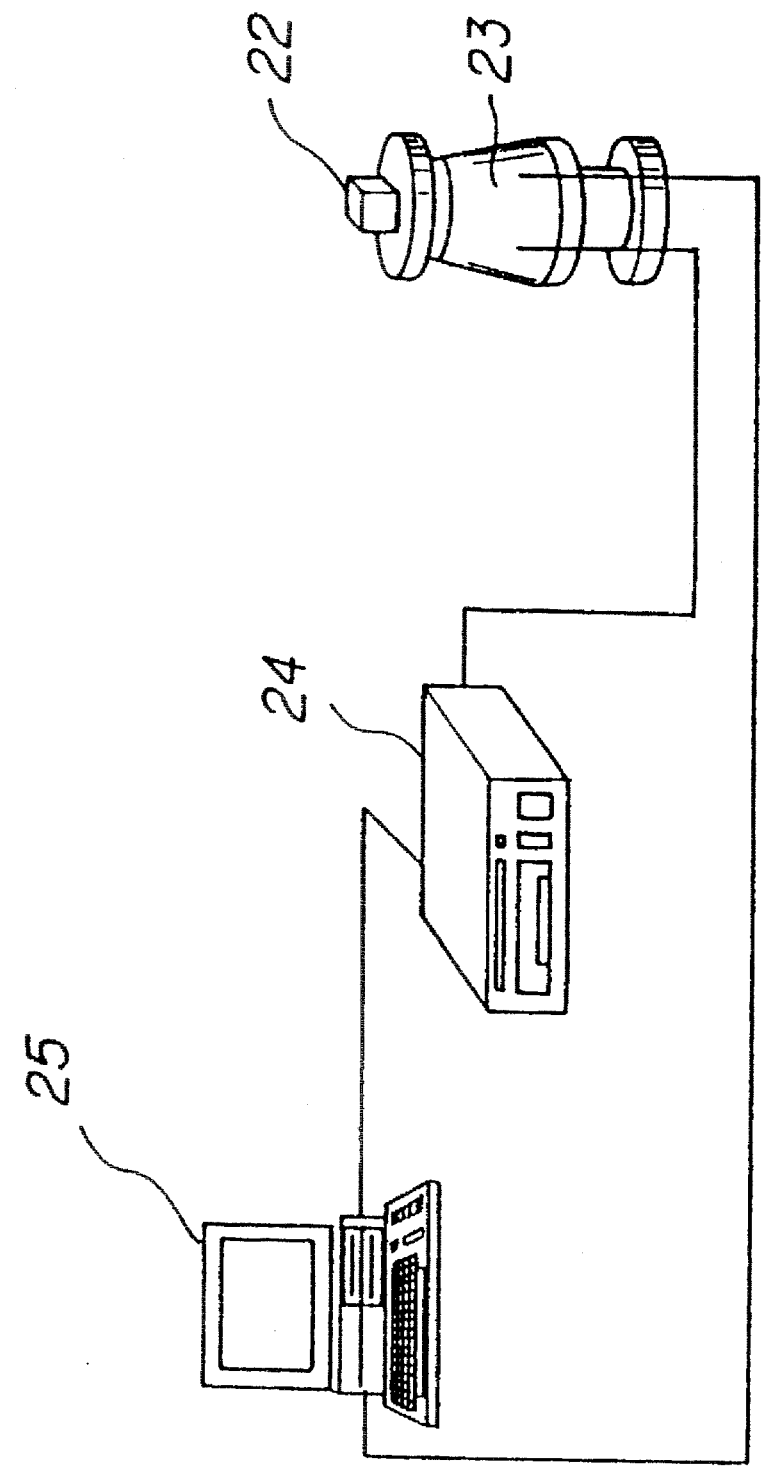
FIG. 3 is an explanatory view showing the calibration of the optical fiber gyro in the preferred embodiment.

FIG. 3 shows an apparatus for calibrating the optical fiber gyro as shown in FIG. 2. The calibrating apparatus comprises a turn table 23 for rotating the optical fiber gyro 22, a driver 24 for driving the turn table 23 to rotate with a predetermined rotative velocity, and a personal computer 25 for controlling the driver 24 to drive the turn table 23.

In the calibrating apparatus, an angular velocity $\Omega$ applied to the optical fiber gyro 22 is changed by driving the turn table 23 with a rotative velocity controlled via the driver 24 by the personal computer 25. Then, data X measured in the optical fiber gyro 22 are supplied to the personal computer 25, in which a table comprising angular velocities $\Omega$ and measured data X is prepared.

Where a phase modulating degree m of the phase modulator 7 is controlled to be constant, the measured data X is $S/S_2$ or $K \cdot S_1/S_2$, and where the phase modulating degree m is not controlled to be constant, the measured data X is $[J_2(m)/J_1(m)] \cdot [S/S_2]$ or $[J_2(m)/J_1(m)] \cdot [K \cdot S_1/S_2]$. The selections of a measuring range for S and that for $S_1$ are automatically carried out in the CPU 11 of the optical fiber gyro 22 in accordance the value $S/S_2$.

In the table composed of the angular velocities $\Omega$ and the measured data X, an angular velocity $\Omega e$ of the earth at a position where the calibration of the optical fiber gyro 22 is carried out is added to the measured angular velocities $\Omega$ to prepare a new table.

The angular velocity $\Omega e$ of the earth is represented by the equation (10).

$$\Omega_e = \frac{-360°}{(24\ hr) \times (60\ min) \times (60\ sec)} \times \sin\phi(°/sec) \quad (10)$$

Where $\phi$ is a latitude which is positive in the clockwise direction.

The table thus prepared is a function of the measured data X relative to the angular velocities $\Omega$. Then, the table is converted to a table for the angular velocities $\Omega$ relative to the measured data X. The interval of the measured data X is preferably constant in processing the measured data X. Therefore, it is preferable to use linear interpolation in converting the table.

The calculated table data are stored in the EEPROM 15 in the signal processing circuit 8, so that the CPU 11 in the optical fiber gyro 22 accesses to the EEPROM 15 to read the angular velocities $\Omega$ therefrom. It is preferable to use the linear interpolation even in calculating the angular velocities $\Omega$.

In operation, the optical fiber gyro 22 is mounted on the turn table 23, and an angular velocity applied to the sensing loop 3 of the optical fiber gyro 22 is to be detected. The applied angular velocity and data detected in the signal processing circuit 20 are stored into the EEPROM 15 in which a table is prepared. The table is accessed in the signal processing circuit 8 by the CPU 11. Consequently, an angular velocity is obtained in a short time as compared to the conventional optical fiber gyro in which an Arctan ($\tan^{-1}$) function is used. Further, the shift of a measuring range changing point caused by the change of power in an output light of the laser light source 1 is avoided by using a ratio between a value obtained by amplifying a fundamental wave signal (a phase modulating frequency signal) and an even harmonic wave signal, in case where a measuring range is changed, and the measuring precision of angular velocities is improved, because data obtained by multiplying an amplification factor K of the pre-amplifier 5 to the fundamental wave component $S_1$ which is synchorously detected is data for detection of an angular velocity.

Next, examples of tables will be explained.

It is presumed that the data $X_1$ is $S/S_1$ or $[J_2(m)/J_1(m)] \cdot [S/S_2]$, and the data $X_2$ is $K \cdot [S/S_2]$ or $[J_2(m)/J_1(m)] \cdot [K \cdot S/S_2]$.

Figure 5:
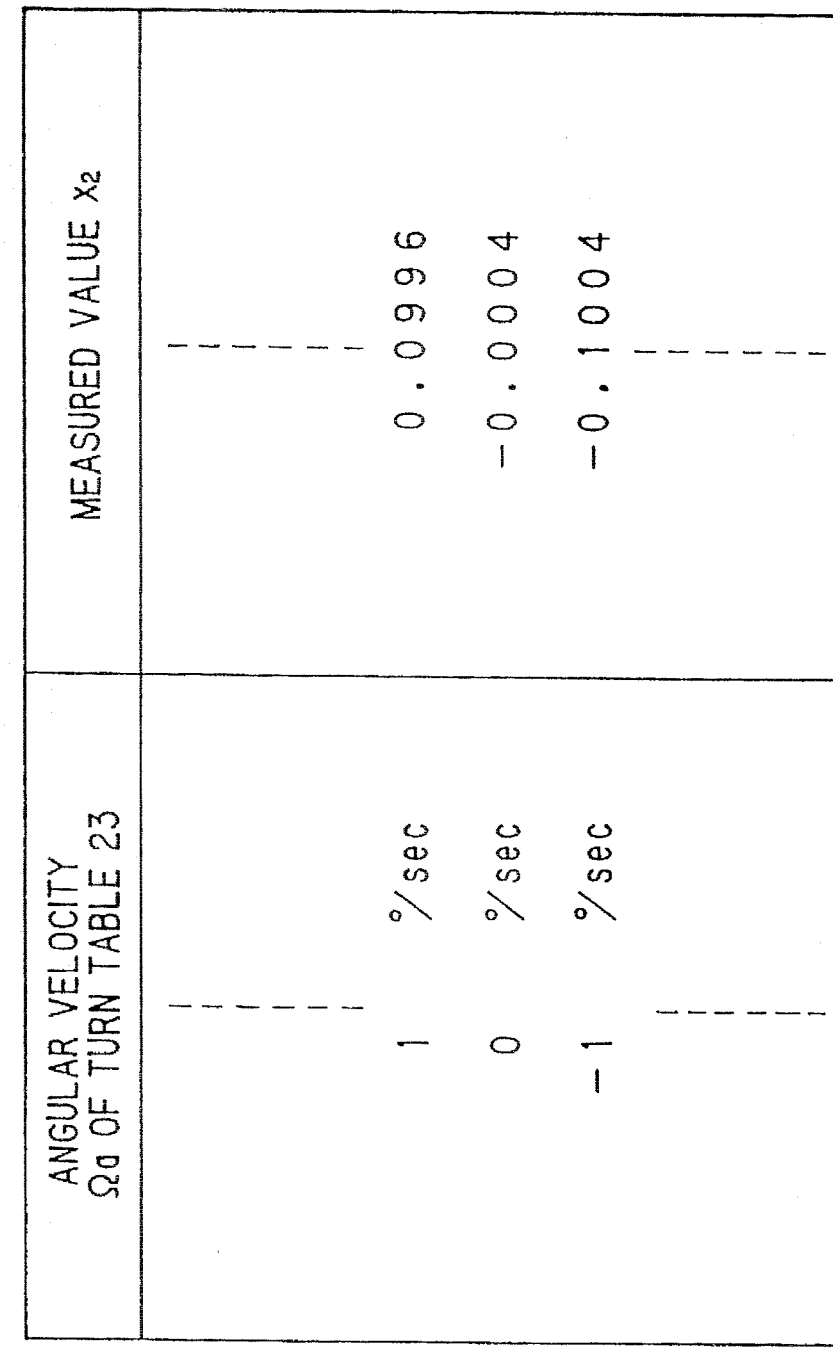

FIGS. 4 and 5 show tables including the results of angular velocities measured by rotating the optical fiber gyro 22 on the turn table 23. The tables include angular velocities $\Omega$ of the turn table 23 and the measured values $X_1$ and $X_2$.

Figure 7:
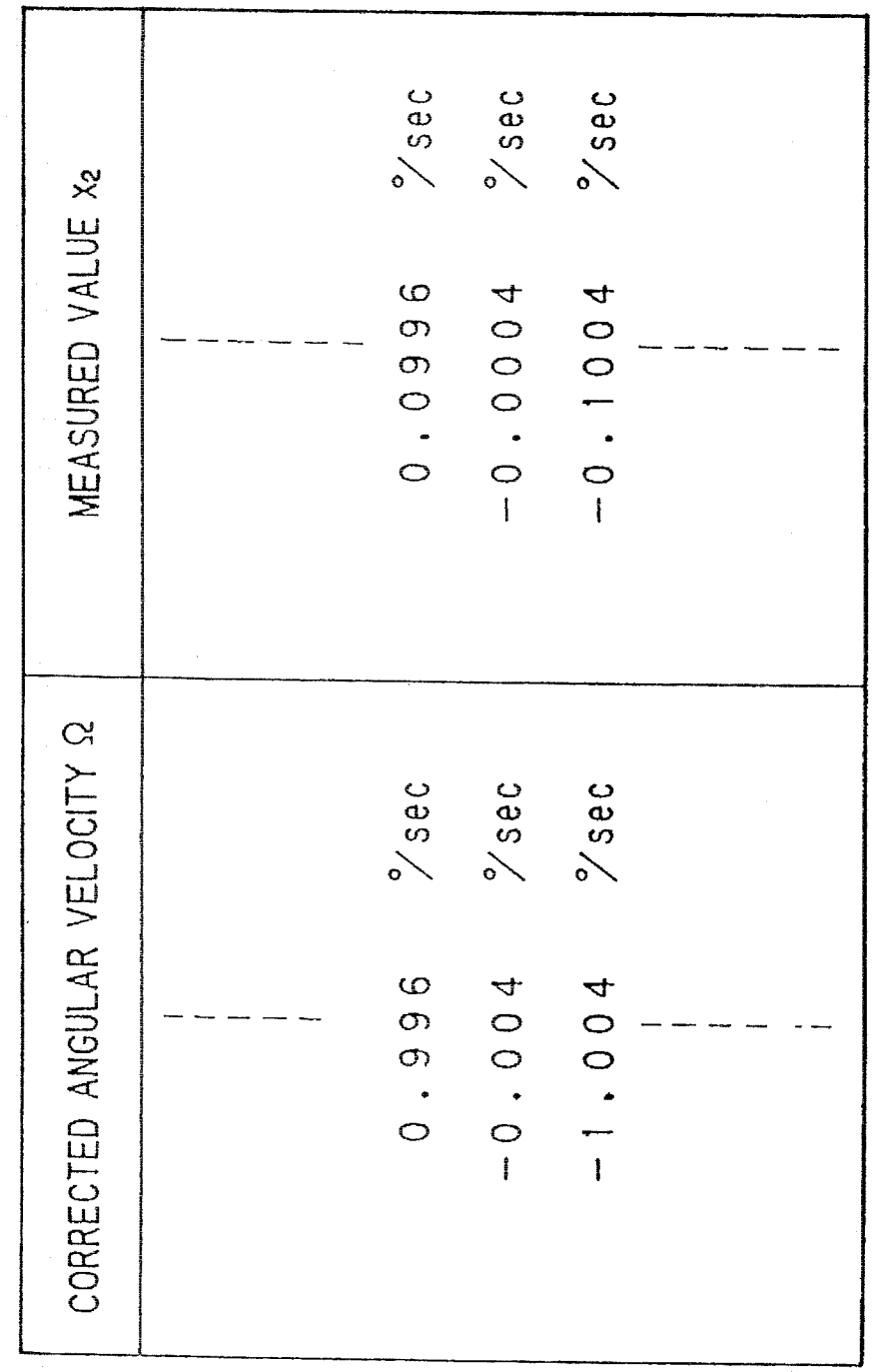

FIGS. 6 and 7 show tables in which the data in FIGS. 4 and 5 are corrected in consideration of the angular velocity of the earth.

In FIGS. 6 and 7, $\Omega$ is a value which is obtained by adding the angular velocity $\Omega e$ of the earth to the angular velocity $\Omega a$ of the turn table 23, and the latitude $\phi$ is 90°, wherein FIG. 6 corresponds to FIG. 4, and FIG. 7 corresponds to FIG. 5, respectively.

In FIGS. 6 and 7, the tables thus prepared include the angular velocities $\Omega$ which do not have an equal interval between each adjacent two values. Actually, the A/D converter 10 is saturated in the range where the values of the angular velocities $\Omega$ are small and large. For this reason, tables as shown in FIGS. 8 and 9 are prepared in accordance with the correction of the tables in FIGS. 6 and 7 by using the linear interpolation.

Figure 9:
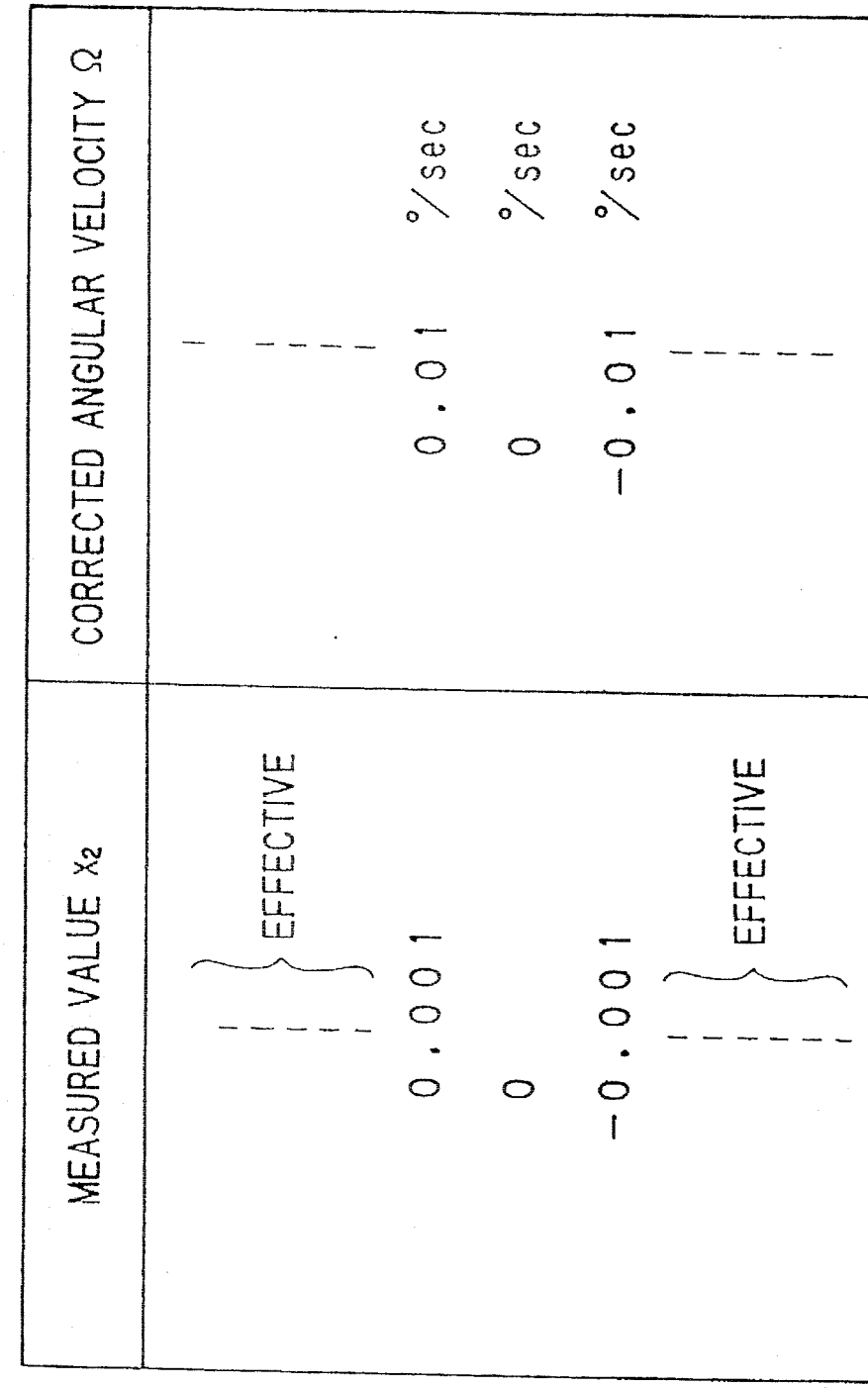

In FIGS. 8 and 9, the values $X_1$ are amplified ones, so that the A/D converter 10 is saturated beyond lower and upper angular velocities designated by "CHANGE", because a converting voltage range of the A/D converter 10 has an operative limitation, as shown in FIG. 8. For this reason, the range is changed to the values $X_2$, as shown in FIG. 9, before an angular velocity will be the constant value.

In the preferred embodiment, the duplicate and quadruple harmonic wave signals are used as even harmonic wave signals. On the other hand, other harmonic wave signals may be used in the invention.

In the preferred embodiment, the values $X_1$ and $X_2$ are separated in the different tables. On the other hand, the values $X_1$ and $X_2$ may be listed to be values X in one table, where no shift of the measuring range changing point caused by the change of power in the output light of the light source is observed, and an amplification degree is corrected by software. In such a case, the capacity of the memory is decreased.

As described above, the optical fiber gyro in the invention includes a memory for storing angular velocities applied at the calibration stage to the sensing loop and data measured in the signal processing circuit, and an access circuit (CPU) for reading the stored angular velocities in accordance with the measured data in actual operation. For this structure, there are expected advantages in the invention in that response is fast, and precision is high.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical fiber gyro using a phase modulating method, comprising:

means for providing two lights;

means for modulating a phase of at least one of said two lights;

an optical fiber sensing loop for propagating said two lights in clockwise and counter clockwise directions, said optical fiber sensing loop being mounted on a rotating member, and said at least one of said two lights being supplied from said modulating means;

an optical coupler for coupling said two lights propagated through said optical fiber sensing loop and supplied therefrom to provide a coupled light;

a light detector for receiving said coupled light to generate an output signal; and a signal processing circuit for processing said output signal to detect an angular velocity of said rotating member;

wherein said signal processing circuit comprises:

means for generating data including a ratio of a fundamental wave component of said output signal to an even harmonic wave component of said output signal dependent on an angular velocity of said rotating member by processing said output signal;

a memory for storing angular velocities applied at a preparatory state on said rotating member, and data generated in said generating means when said angular velocities are applied at said preparatory state on said rotating member; and means for reading an angular velocity corresponding to data generated in said generating means at an operation state.

2. An optical fiber gyro, according to claim 1, wherein:

said data stored in said memory is said ratio of a fundamental wave component of said output signal to an even harmonic wave component of said output signal when a modulation degree of said modulating means is controlled to be constant.

3. An optical fiber gyro, according to claim 1, wherein:

said data stored in said memory are a modulation degree of said modulating means and said ratio of a fundamental wave component of said output signal to an even harmonic wave component of said output signal, said modulation degree being obtained from two even harmonic wave components.

4. An optical fiber gyro, according to claim 1, wherein:

said signal processing circuit, comprises:

an amplifier for amplifying said fundamental wave component of said output signal by an amplification factor to provide an amplified fundamental wave component; and means for changing over a measuring range of said angular velocity in accordance with said amplified fundamental wave component; and said data stored in said memory are a ratio of said amplified fundamental wave component to an even harmonic wave component, and a ratio of a value obtained by multiplying said amplification factor to said fundamental wave component and said even harmonic wave component.

5. An optical fiber gyro, according to claim 1, wherein:

each of said angular velocities stored in said memory is an angular velocity which is a sum of said angular velocity generated in said generating means at said preparatory stage and an angular velocity of the earth at a position where said rotating member is located.

* * * * *